United States Patent Office 2,808,139
Patented Oct. 1, 1957

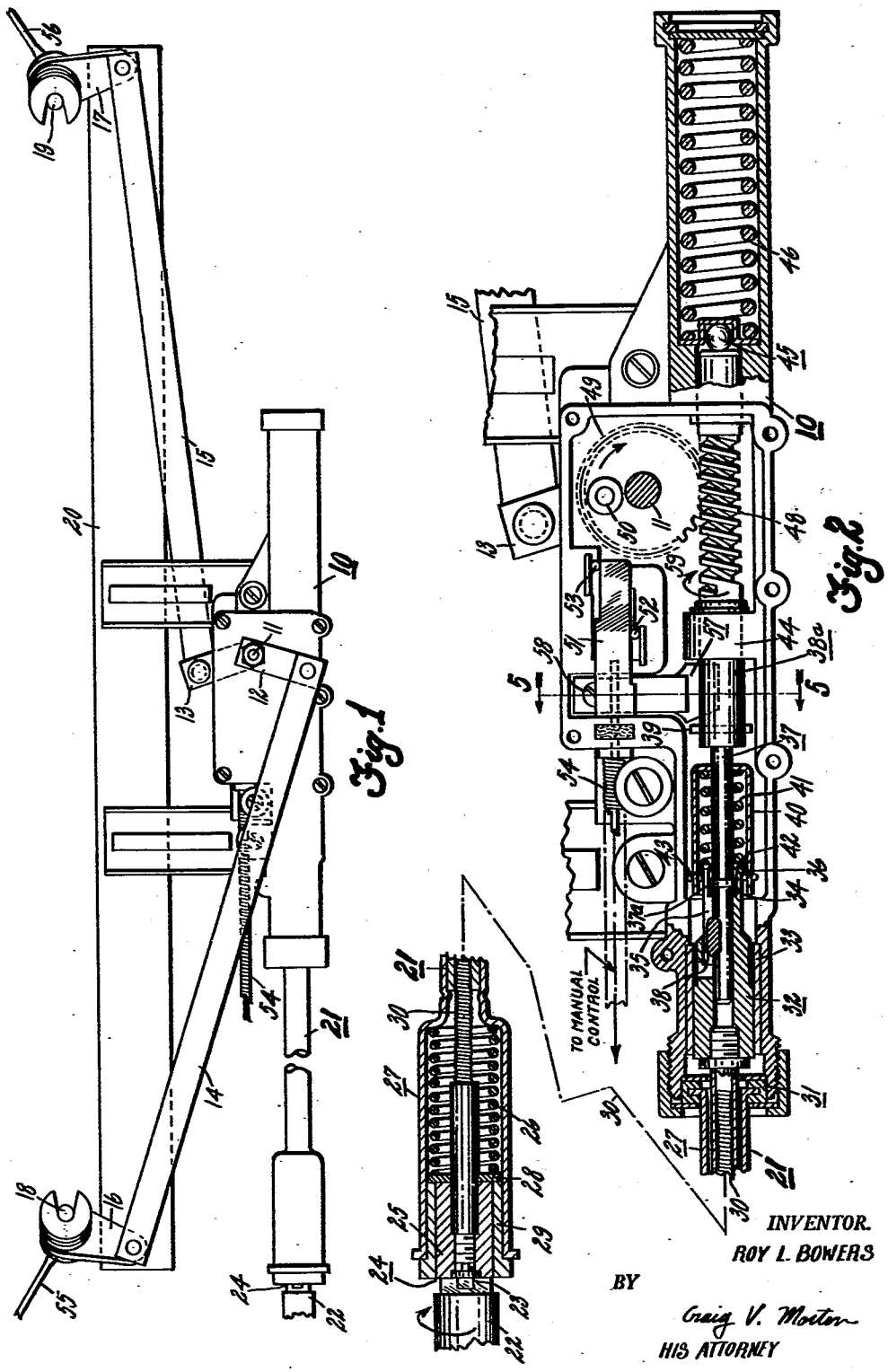

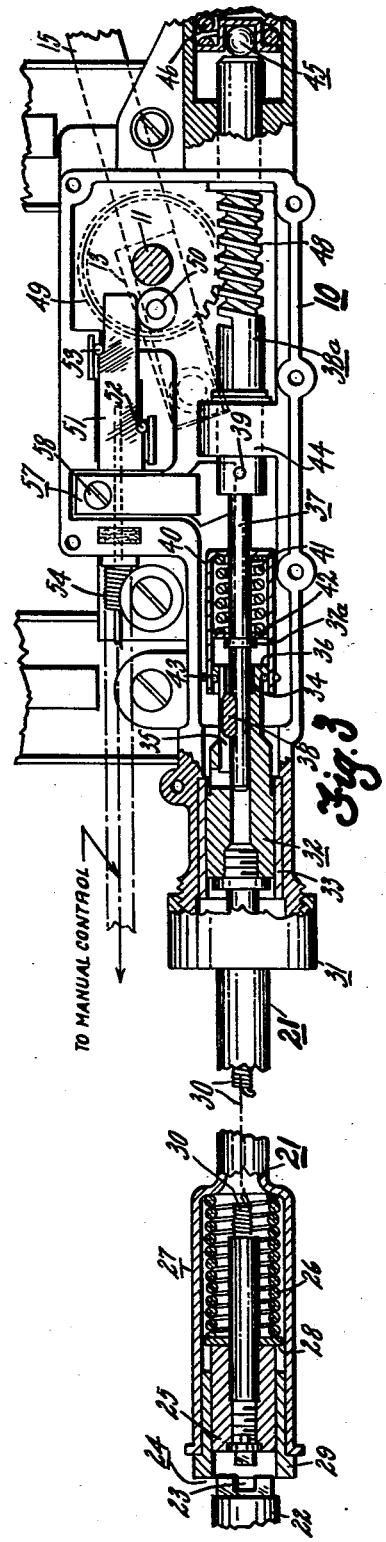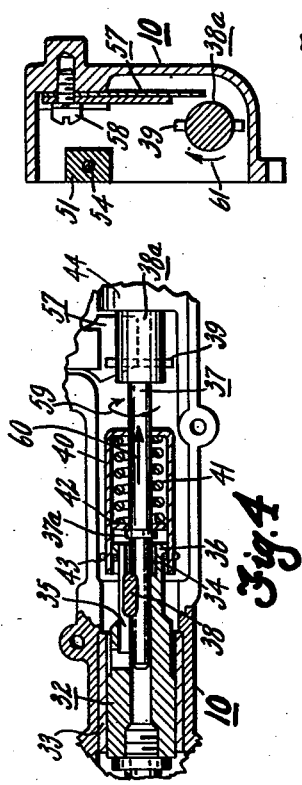

2,808,139

WINDSHIELD WIPER ACTUATING MECHANISM

Roy L. Bowers, Flint, Mich., assignor to General Motors Corporation, Detroit, Mich., a corporation of Delaware Application June 23, 1953, Serial No. 363,477

13 Claims. (Cl. 192—12)

The present invention pertains to actuating mechanism for windshield wipers, and more particularly to windshield wiper actuating mechanism driven by a rotary power source.

Heretofore windshield wiper actuating mechanisms designed for operation by a rotary power source, such as an engine operated shaft, have been unwieldy and expensive. The apathetic attitude and reluctance of vehicle manufacturers towards the adoption of mechanically driven wiper actuating mechanisms has been attributed to these facts. One factor contributing to the expense of mechanically driven actuating mechanisms has been the complicated control apparatus. Accordingly, among my objects are the provision of simplified control means for a power driven actuating mechanism; the further provision of actuating mechanism including means for positively arresting rotation of a driven member at a predetermined angular position thereof; and the still further provision of automatically operable clutch means for interrupting the driving connection between a driving member and a driven member when rotation of the driven member is arrested.

The aforementioned and other objects are accomplished in the present invention by providing means responsive to relative movement between driving and driven members of the actuating mechanism for releasing clutch means to thereby interrupt the driving connection therebetween. Specifically, the actuating mechanism includes a driving member, which may take the form of an engine driven shaft, and a driven member which takes the form of a worm gear. Resiliently engageable and disengageable clutch means are employed in the driving connection between the driving and driven members. The driving connection also includes a flexible shaft, one end of which receives a driver element having a longitudinally extending keyway slot, and the other end of which is operatively connected to an element of the clutch means. The driver element is rotatably connected to a worm shaft assembly by means of a key, the arrangement being such that while relative rotation between the driver element and the worm shaft assembly is precluded, relative longitudinal movement therebetween is permitted.

The end of the driver element is formed with an annular flange that is normally retained between a snap ring carried by a spring housing and a spring seat movably mounted within the spring housing. The worm shaft assembly includes an annular shoulder, normally received by a counterbored portion of the driver element. The worm shaft assembly, the driver element and a worm gear, constituting the driven member, are rotatably supported within a housing and are components of what will hereinafter be termed a head assembly. The worm operatively engages the worm gear and upon rotation of the worm, rotation is imparted to the worm gear which is converted into oscillatory motion of a pair of spaced shafts in a manner well known in the art. The head assembly housing includes a second spring housing containing a spring which has operative engagement with the end of the worm shaft through a thrust bearing. The worm gear carries an axially extending pin, the purpose of which will hereinafter be described, and the worm shaft is mounted for sliding movement relative to the head assembly housing.

The head assembly also includes a movable arm, or abutment, adapted for engagement with a worm gear pin to thereby positively arrest movement of the worm gear in a predetermined angular position. The head assembly housing further includes a leaf spring assembly, the end of which is disposed in contiguous relation to a cross pin of the worm shaft assembly. Movements of the slidable arm, or abutment, are controlled manually by means of a Bowden wire connection, so as to control the operation of the actuating mechanism.

Operation of the mechanism is as follows, it being assumed that the slidable arm is displaced out of alignment with the worm gear pin. Rotation of the engine driven shaft through the engaged clutch effects rotation of the worm to thereby impart rotation of the worm gear which is connected by conventional cranks and links to a pair of spaced shafts which are oscillated throughout an angle of predetermined amplitude. When it is desired to stop wiper operation, the slidable arm is moved into the path of the worm gear pin to thereby positively arrest rotation of the worm gear at a predetermined point in which the wiper blades are in one end position of their strokes. Relative rotation between the worm and worm gear results in axial movement of the worm relative to the worm gear, axial movement of the worm shaft assembly being opposed by the thrust bearing and spring assembly. Axial movement of the worm shaft assembly stresses a second spring which is interposed between the worm shaft assembly and the driver element, the construction and arrangement being such that when the second spring is sufficiently stressed, it will move the flexible shaft axially to thereby interrupt the driving connection between the engine driven shaft and the flexible shaft.

Inasmuch as the worm is reversible, means for preventing retrograde movement of the worm shaft assembly are provided, these means being constituted by the cross pin of the worm shaft assembly and the spring leaf. The construction and arrangement of the cross pin and the spring leaf assembly is such as to permit rotation of the worm shaft assembly by the flexible shaft in one direction, while precluding rotation of the flexible shaft by the worm shaft assembly in the other direction. When it is desired to resume operation of the wiper actuating mechanism, the slidable arm is moved out of engagement with the worm gear pin, thereby freeing the worm gear for rotation. The thrust bearing and spring assembly associated with the worm shaft assembly will then move the worm shaft axially, it being understood that the worm shaft assembly cannot rotate until the cross pin is moved out of engagement with the leaf spring assembly. As soon as the cross pin clears the leaf spring assembly, the worm shaft assembly is free to rotate, thus releasing the spring stress on the flexible shaft and permitting a clutch spring to move the flexible shaft axially so as to engage the clutch, thereby completing the driving connection between the engine driven shaft and the worm gear.

Further objects and advantages of the present invention will be apparent from the following description, reference being had to the accompanying drawings wherein a preferred embodiment of the present invention is clearly shown.

In the drawings:

Fig. 1 is a fragmentary view in elevation of windshield wiper actuating mechanism constructed according to this invention.

Fig. 2 is a fragmentary sectional view of the actuating mechanism of Fig. 1 in the running position.

Fig. 3 is a view similar to Fig. 2 with the mechanism in the parked position.

Fig. 4 is a fragmentary sectional view illustrating the stressing of the clutch release spring.

Fig. 5 is a sectional view taken on line 5—5 of Fig. 2.

With particular reference to Fig. 1 of the drawings, windshield wiper actuating mechanism is shown including a head assembly 10 from which a rotatable shaft 11 extends, the shaft 11 having a pair of spaced crank arms 12 and 13. The crank arms 12 and 13, respectively, are pivotally connected to links 14 and 15, the links, in turn, being pivotally connected to crank arms 16 and 17 of spaced rock shafts 18 and 19. The head assembly 10 is attached to a supporting member 20, rotation being imparted to the shaft 11 through a flexible cable assembly 21, which is driven from an engine driven shaft 22. The mechanism thus far described operates in a conventional manner inasmuch as rotation of the shaft 22 is transmitted to the shaft 11, which, in turn, imparts oscillation to the rock shafts 18 and 19 through the crank and link assembly heretofore described.

Referring to Fig. 2, the detailed construction of the flexible shaft assembly 21 and the head assembly 10 will next be described. The end of the engine driven shaft 22 is provided with a diametrically extending slot 23, which constitutes the driving element of a clutch 24. The driven element of the clutch 24 is constituted by a toothed member 25, the tooth of member 25 normally being urged into the slot 23 of the shaft 22 by means of a compression spring 26 disposed within a housing 27 and urging the member 25 to the left, as viewed in Fig. 2, through a washer 28. The member 25 is slidably mounted within a sleeve 29 of the housing 27, and is operatively connected to one end of a flexible shaft 30.

The flexible shaft 30 is enclosed by housing, or sheath, 27, one end of the sheath 27 being fixedly attached by a coupling assembly, indicated generally by the numeral 31, to the housing of head assembly 10. The other end of flexible shaft 30 extends into the housing of head assembly 10 and threadedly engages a driver element 32, which is mounted for rotation and longitudinal movement within the head assembly housing by means of a sleeve bearing 33. The end of shaft 30 associated with driver element 32 is threadedly connected therewith so as to provide a quick detachable connection therebetween. Driver element 32 is through bored and one end of the through bore is formed with a counterbore 34. The driver element 32 is also formed with a longitudinally extending keyway slot 35, one end of which is closed by a washer 42 abutting an upturned flange portion 36. The driver element is rotatably connected to an intermediate shaft 37 by means of a key 38, the assembly permitting relative axial movement between the intermediate shaft 37 and the drive element 32.

The shaft 37 includes an annular shoulder 37a which is received within the counterbored portion 34 of the driver element 32. In addition, the shaft 37 is operatively connected to a worm shaft 38a by means of a cross pin 39, the function of which will appear more fully hereinafter. The worm shaft 38a and the intermediate shaft 37 will hereinafter be referred to as the worm shaft assembly. A portion of the intermediate shaft 37 is encompassed by a cupshaped spring housing 40. The shaft 37 forms a guide for a spring 41 disposed within the housing 40, one end of the spring 41 abutting the closed end of the housing and the other end of spring 41 abutting a washer 42, which, in turn, engages the upturned flange 36 of the driver element so as to normally keep the flange 36 in engagement with a snap ring 43 carried by the housing 40.

The worm shaft 38a is supported for rotation and axial movement relative to the head assembly by bearing means 44. The free end of the worm shaft 38a engages a thrust bearing assembly 45, which is spring urged to the left, as viewed in Fig. 2, by means of a spring 46 situated within a spring housing formed as an integral part of the head assembly 10.

The worm shaft 38a includes a portion formed as a reversible worm 48, the worm portion 48 having operative engagement with a worm gear 49, which is carried by shaft 11. The worm gear 49 is formed with an axially extending pin 50, which is displaced radially from the rotative axis of the worm gear. An arm, or abutment member, 51 is slidably mounted within the head assembly housing by means of rollers 52 and 53. One end of the slidable arm 51 is operatively connected to the end of a Bowden wire 54 that is manually operable to move the arm 51 longitudinally within the head assembly housing. The end of arm 51 may be moved by the Bowden wire 54 into the path of the pin 50 on the rotating worm gear 49. When pin 50 of the worm gear engages the arm 51, rotation of the worm gear and the shaft 11 is positively arrested at a predetermined angular position in which the rock shafts 18 and 19 position wiper blades 55 and 56, respectively, at one end of their strokes, in what is termed a parked position.

With particular reference to Figs. 2 and 5, it is seen that the head assembly housing 10 includes a leaf spring assembly 57 attached thereto by means of a threaded device 58. One end of the leaf spring assembly 57 is disposed in contiguous relation to worm shaft 38a and the cross pin 39. The cross pin 39 cooperates with the end of leaf spring 57 to prevent retrograde movement of the worm shaft assembly in a manner to be described.

*Operation*

With reference to Figs. 2 through 5, the operation of the actuating mechanism will be described. With the engine driven shaft 22 rotating in a clockwise direction, as shown by the arrow in Fig. 2, the clutch 24 engaged, and the arm 51 positioned out of alignment with the pin 50 of the worm gear, as shown in Fig. 2, it will be apparent that rotation of the flexible shaft 30 through the clutch 24 by means of the shaft 22 will impart clockwise rotation to the worm 48 through the keyed connection between the driver element 32 and the worm shaft assembly. Clockwise rotation of the worm 48 will, in turn, effect clockwise rotation of the worm gear 49, which will impart oscillation to the spaced rock shafts 18 and 19 through the crank and linkage assembly heretofore described. When it is desired to stop operation of the wiper actuating mechanism, the operator manipulates Bowden wire 54, which may be connected to control knob on the dashboard of a vehicle, not shown, so as to effect longitudinal movement of the arm 51 into the path of the worm gear pin 50. Thereafter, the pin 50 will engage the end of arm 51 so as to positively arrest rotation of the worm gear 49 and interrupt movement of the wiper blades 55 and 56 at one end of their strokes.

Inasmuch as the clutch 24 is in the engaged position, rotation of shaft 22 in a clockwise direction will continue to rotate worm shaft assembly in the clockwise direction, as shown by the arrow 59 in Fig. 4. As rotation of the worm gear 49 is positively restrained by engagement of pin 50 with arm 51, rotation of the worm shaft 38 will cause the worm 48 and the worm shaft assembly to move axially in the direction of arrow 60 of Fig. 4. Initial movement of the worm shaft assembly to the right, as viewed in Figs. 2 and 4, is opposed by spring 46 through the thrust bearing assembly 45. Thus, as the worm shaft assembly moves to the right in the direction of arrow 60 of Fig. 4, the spring 46 is compressed, it being understood that shaft 37 may move axially relative to the driver element 32 by reason of the key and slot connection therebetween. Initial axial movement of the shaft 37 relative to the driver element 32 will not stress spring 41 inasmuch as the shoulder 37a is free to move within the counterbored portion 34 of the driver element 32. However, continued rightward axial movement of the worm shaft assembly will result in the shoulder 37a engaging the washer 42 so as to compress spring 41. Rightward movement of the worm shaft assembly will also position the cross pin in alignment with the end of leaf spring assembly 57. However, inasmuch as the worm shaft assembly is rotating clockwise in the direction of arrow 59 in Fig. 4, and clockwise in the direction of arrow 61 in Fig. 5, the end of leaf spring assembly 57 will not interfere with axial movement and rotation of the worm shaft assembly.

As soon as the thrust of spring 41, which is compressed by axial movement of the shaft 37, exceeds the opposing thrust of spring 26, the housing 40 will move abruptly to the right and assume the position shown in Fig. 3, whereupon the toothed member 25 will be disengaged from the slot 23 thereby releasing the clutch 24, since movement of housing 40 is transmitted to the flexible shaft 30 by the driver element 32 having flange 36 operatively connected to housing 40. As soon as the clutch 24 is released, rotation of the flexible shaft 30 and the worm shaft assembly will cease and the compressed spring 46 acting through thrust bearing assembly 45 will tend to move the worm shaft 38a axially to the left, as viewed in Fig. 3. However, retrograde movement, or movement to the left, as viewed in Fig. 3, is prevented by engagement of cross pin 39 with the end of leaf spring assembly 57. The leaf spring assembly 57 and the cross pin 39 in effect form a ratchet mechanism which permits clockwise movement of the shaft 38a but precludes counterclockwise movement thereof. Thus, as viewed in Fig. 5, movement of shaft 38a in the direction of arrow 61 is permitted by the leaf spring assembly 57 inasmuch as the cross pin 39 will merely flex the end of the leaf spring assembly as it passes. However, rotation in the opposite direction will be prevented inasmuch as the end of leaf spring assembly 57 will engage the cross pin 39, thereby preventing retrograde movement of the worm shaft 38a.

When it is desired to again operate the wiper actuating mechanism, the operator manipulates Bowden wire 54 so as to move the arm 51 out of engagement with the pin 50, thus freeing the worm gear 49 for rotation. As the worm gear 49 is freed for rotation, the spring 46 may move the worm shaft 38a axially to the left, as viewed in Fig. 3, inasmuch as the cross pin 39 and leaf spring assembly 57 only prevent reverse rotation of the worm shaft 38a. Since the worm gear 49 is free to rotate, axial movement of the worm shaft 38a may be effected without rotation thereof until the cross pin 39 clears the end of leaf spring 57, whereupon the worm shaft 38a is free to rotate in a counterclockwise, or reverse, direction. The worm shaft assembly including shafts 37 and 38a, will continue to move to the left until the thrust bearing assembly 45 engages a portion of the head assembly housing 10, thereby releasing the stress on spring 41 and permitting the clutch spring 26 to move the toothed member 25 into engagement with the slot 23, thereby engaging the clutch.

From the aforegoing, it is apparent that the present invention provides simplified controlled mechanism for a mechanically operated windshield wiper. Moreover, the clutch control mechanism is relatively inexpensive to manufacture and extremely reliable in operation.

While the embodiment of the present invention as herein disclosed, constitutes a preferred form, it is to be understood that other forms might be adopted.

What is claimed is as follows:

1. Windshield wiper actuating mechanism including in combination, a rotatable driving member, a rotatable driven member, means including a clutch operatively associated with the driving member for establishing a driving connection between the driving and driven members, means operable to positively arrest rotation of the driven member at a predetermined angular position thereof, and means operatively associated with said first recited means and said clutch and operable when rotation of said driven member is arrested for releasing said clutch to interrupt the driving connection between the driving and driven members, said last recited means including a spring operatively associated with said clutch and said first recited means so as to be stressed upon relative rotation between said driving and driven members when rotation of said driven member is positively arrested, the construction and arrangement bing such that a predetermined stress of said spring will release said clutch with a snap action.

2. The combination set forth in claim 1 wherein said clutch includes resilient means operative to maintain said clutch engaged, said resilient means exerting a force in opposition to the force of said spring which is stressed upon relative movement between said driving and driven members.

3. The combination set forth in claim 1 wherein said driven member comprises a worm gear having an axially extending pin thereon, and wherein the means for positively arresting rotation of said worm gear includes a slidable abutment member which is manually movable into and out of the path of said worm gear pin.

4. The combination set forth in claim 1 wherein the means for establishing driving connection between the driving and driven members includes, a shaft assembly having operative engagement with the driven member and the clutch for transmitting rotation of the driving member to the driven member when the clutch is engaged, the operative connection between the driven member and said shaft assembly being such that upon rotation of said driven member being arrested continued rotation of the shaft assembly will result in axial movement thereof relative to the driven member.

5. The combination with windshield wiper actuating mechanism including a rotatable driving member, a rotatable driven member, means including a clutch operatively associated with the driving member for establishing a driving connection between the members, and means operable to positively arrest rotation of the driven member at a predetermined angular position thereof, of means operatively associated with the first recited means and said clutch, and operable when rotation of said driven member is arrested for releasing said clutch to disrupt the driving connection between the driving and driven members, comprising an element operatively connected with the driving member through said clutch and operatively engaging the driven member for imparting rotation to the driven member upon rotation of the driving member with the clutch engaged, said element being adapted for longitudinal movement relative to the driven member upon rotation of said element relative to the driven member after rotation of the driven member is positively arrested, and a spring operatively associated with said element and said clutch and stressed upon longitudinal movement of said element, the construction and arrangement being such that a predetermined stress of said spring is operable to release said clutch with a snap action.

6. The combination with windshield wiper actuating mechanism including, a rotatable driving member, a rotatable driven member, means including a clutch operatively associated with the driving member for establishing a driving connection between the members, and means operable to positively arrest rotation of the driven member at a predetermined angular position thereof, of means operatively associated with the clutch and said first recited means and operable to release said clutch when rotation of said driven member is arrested, said means including a rotatable and axially movable shaft having operative engagement with the clutch and the driven member, and means operatively associated with said shaft for preventing retrograde movement thereof relative to the driven member when said driven member is restrained from rotation and said clutch is released.

7. Control means for wiper actuating mechanism of the type including, a rotatable driving member, a rotatable driven member, a rotatable and axially movable rigid shaft operatively associated with the driven member, and means including a releasable clutch for drivingly connecting the driving member and said shaft, comprising in combination, first resilient means associated with said clutch and normally operative to maintain the clutch engaged, second resilient means operatively associated with said shaft and opposing axial movement thereof, means operable to positively arrest rotation of the driving member so as to cause relative rotation between the driven member and said shaft thereby effecting axial movement of said shaft, and third resilient means operatively associated with said shaft and stressed upon axial movement thereof, said last mentioned resilient means acting in opposition to the first mentioned resilient means and operable to release said clutch with a snap action when axial movement of said shaft stresses said last mentioned resilient means a predetermined amount.

8. The combination set forth in claim 7 wherein means operatively associated with said shaft are provided for preventing retrograde movement of said shaft after said clutch has been released and while rotation of said driven member is positively arrested.

9. The combination set forth in claim 7 wherein the means constituting the driving connection between the driving member and the rigid shaft includes a flexible shaft operatively connected to a driver element, and wherein the driver element is operatively connected to said rigid shaft by means of a key which permits relative axial movement therebetween.

10. The combination set forth in claim 9 wherein said last mentioned resilient means comprise a spring situated within a housing having operative connection with said driver element, and wherein axial movement of said shaft compresses said spring to thereby effect axial movement of said driver element and flexible shaft, said clutch including an element operatively connected with said flexible shaft and normally urged to a position wherein said clutch is engaged by said first resilient means.

11. Windshield wiper actuating mechanism including in combination, a rotatable driving member, a rotatable driven member, a rotatable and axially movable shaft drivingly engaging said driven member, an element connected to rotate with said shaft, said shaft being movable axially relative to said element and said element being movable axially relative to said shaft, means including a clutch for rotatably connecting said element and said driving member, first resilient means normally maintaining said clutch engaged, means operable to positively arrest rotation of said driven member at a predetermined angular position thereof whereby continued rotation of said shaft by said driving member will effect axial movement of said shaft relative to said element, and second resilient means operatively connected with said shaft and said element and stressed upon axial movement of said shaft relative to said element, said second resilient means being operable to effect axial movement of said element relative to said shaft with a snap action upon being stressed a predetermined amount so as to release said clutch.

12. The combination set forth in claim 11 wherein said second resilient means is disposed within a housing, said housing being attached to said element, and wherein said shaft includes a shoulder engageable with said resilient means for stressing said resilient means upon axial movement of said shaft relative to said element.

13. The combination set forth in claim 11 wherein said mechanism includes means for preventing retrograde axial movement of said shaft when said clutch is released and rotation of said driven member is positively arrested, said means comprising a cross pin on said shaft and a leaf spring engageable therewith for preventing reverse rotation of said shaft.

References Cited in the file of this patent
UNITED STATES PATENTS

| | | |
|---|---|---|
| 489,279 | White | Jan. 3, 1893 |
| 495,686 | Trethewey | Apr. 18, 1893 |
| 1,850,260 | Daly | Mar. 22, 1932 |
| 2,223,660 | Horton | Dec. 3, 1940 |
| 2,538,432 | Sivacek | Jan. 16, 1951 |

FOREIGN PATENTS

| | | |
|---|---|---|
| 609,970 | France | Aug. 27, 1926 |